United States Patent [19]
Sano et al.

[11] Patent Number: 5,304,897
[45] Date of Patent: Apr. 19, 1994

[54] DEVICE FOR INITIATING DISCHARGE OF COLD-CATHODE DISCHARGE TUBE

[75] Inventors: Takeshi Sano, Hirakata; Masaharu Shinohara, Higashiosaka, both of Japan

[73] Assignee: Sanyo Electric Co., Ltd., Osaka, Japan

[21] Appl. No.: 969,673

[22] Filed: Oct. 28, 1992

[30] Foreign Application Priority Data

Nov. 7, 1991 [JP] Japan ................................ 3-291599
Dec. 3, 1991 [JP] Japan ................................ 3-319196

[51] Int. Cl.$^5$ .......................................... H05B 37/02
[52] U.S. Cl. ................... 315/209 R; 315/336; 315/261; 313/234; 313/632
[58] Field of Search ............... 315/332, 334, 335, 330, 315/337, 150, 264, 261, 260, 336, 5.38, 5.37; 359/50; 313/607, 635, 632, 8, 291, 234

[56] References Cited

U.S. PATENT DOCUMENTS

| | | | |
|---|---|---|---|
| 4,415,840 | 11/1983 | Baumeister | 315/334 |
| 4,739,227 | 4/1988 | Anderson | 315/260 |
| 4,992,703 | 2/1991 | Ramaiah | 315/261 |
| 5,075,603 | 12/1991 | Yoshiike | 315/335 |
| 5,140,221 | 8/1992 | Ichinose | 313/234 |

*Primary Examiner*—Steven Mottola
*Assistant Examiner*—J. Dudek
*Attorney, Agent, or Firm*—Nikaido, Marmelstein, Murray & Oram

[57] ABSTRACT

A cold-cathode discharge tube having an anode and a cathode is provided with a proximity conductor which is divided into a first and second proximity conductor members arranged on the outer bottom surface of the discharge tube below the cathode and below the anode respectively. A high voltage is applied to the first conductor member below the cathode, and the second conductor member below the anode is grounded.

6 Claims, 11 Drawing Sheets

DEVICE FOR INITIATING DISCHARGE OF COLD-CATHODE DISCHARGE TUBE

FIELD OF THE INVENTION

The present invention relates to a device for initiating discharge of cold-cathode discharge tubes for use as backlights in liquid crystal viewfinders of camera-incorporating VTRs and in liquid crystal displays of word processors and as other illumination means.

BACKGROUND OF THE INVENTION

While liquid crystal displays are in wide use in recent years, liquid crystals per se are not luminescent, so that for use in the dark, the liquid display needs to be provided with a backlight at a rear portion thereof for the user to view presentations with the light passing through the liquid crystal. Cold-cathode discharge tubes having a long life are chiefly used as such backlights. With these cold-cathode discharge tubes, however, initiation of discharge causing stabilized firing due to estabilished discharge after energization is dependent on the number of electrons or cations remaining within the tube. Accordingly, if the amount of electrons or cations present is insufficient, there arises the problem of delayed initiation of discharge. Electrons and cations are produced primarily by external light, so that in the case where the liquid display is used as incorporated in other devices, external light through the liquid crystal is not expectable, and the problem becomes more serious owing to scarcities of electrons and cations.

FIG. 21 shows a discharge tube 1 which is provided with a conductor 2 as is already known to overcome the above drawback ("Shomei Kogaku (Illumination Engineering)," edited by Denki Gakkai, p. 72, published by Ohm Co., Ltd. in Jul., 1963). With reference to the drawing, the discharge tube 1 has a cathode 3 at its one end and an anode 4 at the other end thereof. The conductor 2 is adhered to the outer bottom surface of the tube 1 to extend from below the cathode 3 to below the anode 4. (Such a conductor is positioned close to the cathode and anode and will hereinafter be referred to as a "proximity conductor.") The cathode 3 and the anode 4 are connected via a switch 5 to a d.c. power source 6, the high-voltage side being connected to the anode 4, and the ground side to the cathode 3. The proximity conductor 2 is at the same potential as the cathode 3. The discharge tube 1 has a vacuum inside thereof and has small amounts of mercury and argon gas enclosed therein.

When a high voltage is applied to the anode 4 by closing the switch 5, a high electric field is set up across the anode 4 and a portion of the proximity conductor 2 close to the anode 4 since the conductor 2 has the same potential as the cathode 3, highly accelerating electrons and cations present in very small amounts within the discharge tube 1. While migrating toward the anode 4, the accelerated electrons vigorously collide with mercury atoms. A majority of accelerated cations vigorously collide with the proximity conductor 2. These collisions produce secondary electrons, which further collide with mercury atoms to cause emission of additional secondary electrons. Repeated collisions thus taking place produce rapidly increased quantities of electrons and cations, leading to expedited initiation of discharge. Nevertheless, the conventional method of FIG. 21 is not fully effective; many discharge tubes thus adapted still include some which can not be initiated into operation without a delay.

SUMMARY OF THE INVENTION

An object of the present invention is to provide a device for initiating discharge of cold-cathode discharge tubes to effect rapid firing with good stability.

The invention provides a discharge initiating device which has two proximity conductors arranged at the cathode side and at the anode side, respectively, and a drive circuit for applying a high voltage to the proximity conductor at the cathode side and applying a lower voltage to the proximity conductor at the anode side than to the cathode-side conductor to set up an electric field of increased strength at each of two locations respectively between the anode and the anode-side proximity conductor and between the cathode and the cathode-side proximity conductor and to thereby increase the quantity of secondary electrons to be emitted.

In addition to the electric fields of increased strength set up at the respective two locations, the present invention further makes it easy to set up an electric field also between the two proximity conductors.

DETAILED DESCRIPTION OF EMBODIMENTS

Devices embodying the invention for initiating discharge of cold-cathode discharge tubes will be described below in detail with reference to the drawings.

First Embodiment

Figure 1:
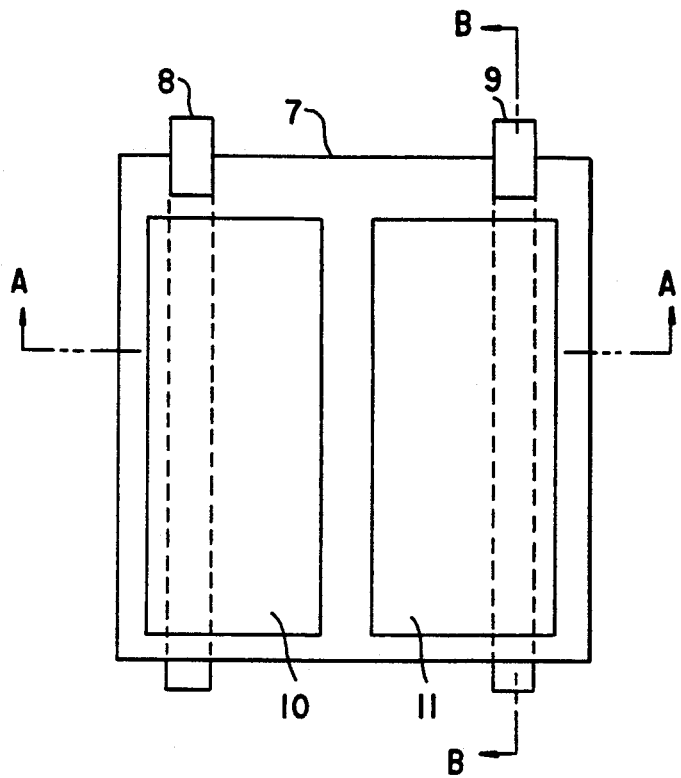
FIG. 1 is a bottom view showing a cold-cathode discharge tube having two proximity conductors which are rectangular.

The discharge tube shown in FIG. 1 is a flat discharge tube, externally measuring 21.4 mm × 19.8 mm, for use in liquid crystal viewfinders. As will be apparent from FIGS. 2 and 3, a discharge tube body 7 comprises an upper portion 25 and a lower portion 26, which are bonded together with frit 27 in a molten state, with a cathode 8 and an anode 9 held therebetween. The tube body 7 is coated with a fluorescence 23 over the inside upper and lower surfaces. The cathode 8 and the anode 9 are arranged at opposite sides of the tube body 7 as opposed to each other. The tube body 7 has affixed to its bottom surface two rectangular electrically conductive double-faced adhesive tapes at the cathode (8) side and the anode (9) side, respectively, independently of each other. These tapes provide proximity conductors 10, 11.

Figure 2:
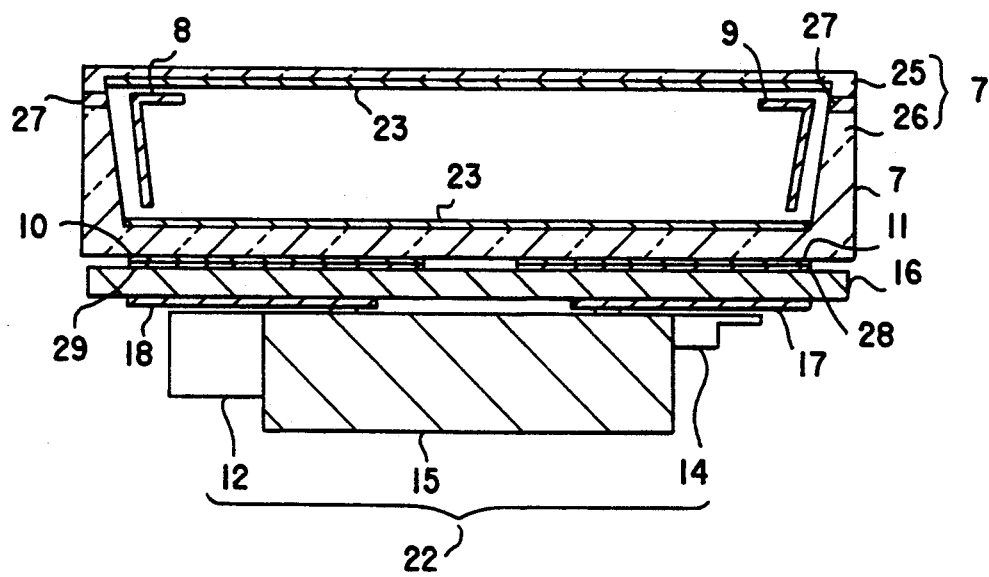
FIG. 2 is a view in section taken along the line A—A in FIG. 1 and showing the discharge tube with a drive circuit board mounted thereon.
Figure 3:
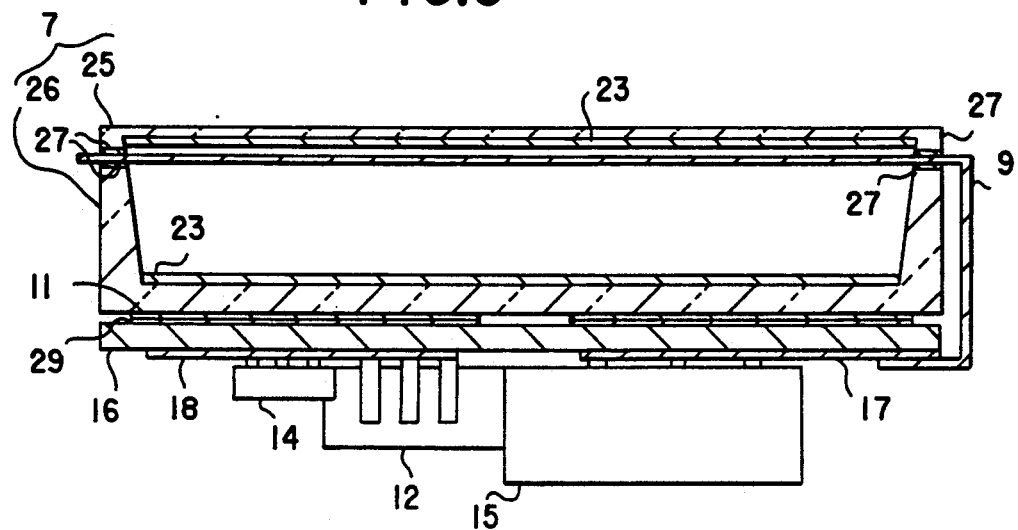
FIG. 3 is a view in section taken along the line B—B in FIG. 1 and showing the discharge tube provided with the drive circuit board.
Figure 4:
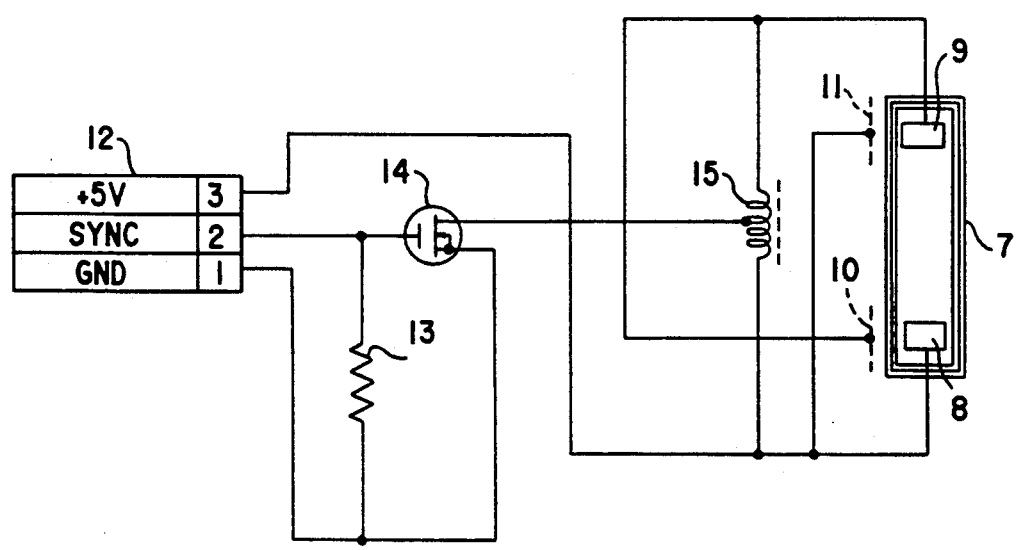
FIG. 4 is a diagram showing an inverter circuit for driving electrodes and the proximity conductors.

FIGS. 2 and 3 are sectional views showing the discharge tube of FIG. 1 and a printed board 16 attached to the tube and having an inverter circuit of FIG. 4 mounted thereon. Although a detailed description will be given later, the printed board 16 has mounted thereon an electronic component 22 which comprises a connector 12, field-effect transistor 14, boosting transformer 15 and resistor 13.

With the electronic component 22 mounted on the printed board 16, a high voltage and a low voltage produced by the inverter circuit are applied to the anode 9 and the cathode 8 by way of a high-voltage pattern 17 and a low-voltage pattern 18, respectively. The anode 9 and the cathode 8 each have one end held inside the tube body 7 and the other end bent to extend toward the bottom surface of the tube body 7. As seen in FIG. 3, each electrode is further bent and holds the printed board 16 between the electrode and the tube body. The bent ends of the anode 9 and the cathode 8 are in contact with and soldered to the high-voltage pattern 17 and the low-voltage pattern 18, respectively, on the printed board 16. The high-voltage pattern 17 and the low-voltage pattern 18 are electrically connected via through holes respectively to a high-voltage pattern 29 and a low-voltage pattern 28 on the rear side of the board, i.e., on the tube body (7) side. The adhesive tapes 10, 11 are affixed to these high-voltage pattern 29 and low-voltage pattern 28 and also to the bottom surface of the discharge tube to serve as the proximity conductors 10, 11, respectively. The adhesive tapes 10, 11 are electrically conductive and therefore provide conductive wiring when fixedly adhered in place.

The flat discharge tube is driven by the inverter circuit of FIG. 4. Power and an inverter control signal are fed from outside to the inverter circuit via a connector 12, which has 1-pin serving as a ground terminal, and 2-pin serving as a terminal to which the signal, i.e. pulse signal, is applied for controlling the inverter circuit. The control pulse signal used in the present embodiment is 63.5 microseconds in period and 10 microseconds in pulse width. The connector has 3-pin serving as a power source terminal for the inverter circuit. A voltage of 5 V is applied to this terminal in the embodiment. The control signal fed through the connector 12 is terminated at the resistor 13 and transmitted to the gate of the FET 14. The FET 14, which is an N- type field effect transistor, is used as a switch. When positive pulses of not lower than the threshold voltage of the FET 14 are applied to 2-pin, the FET 14 conducts. The FET 14 is brought out of conduction when pulses of lower than the threshold voltage are applied to the pin. The source of the FET 14 is connected to the ground terminal. As shown in FIG. 4, the boosting transformer 15 has a lower end connected to the 5-volt power source, the cathode 8 and the proximity conductor 11 at the anode side, an intermediate terminal connected to the drain of the FET 14, and an upper end connected to the anode 9 and the proximity conductor 10 at the cathode side. When the FET 14 is brought into the conducting state, current flows from the lower end of the transformer 15 to the drain of the FET 14 via the intermediate terminal, giving rise to a counter electromotive force at the upper end of the transformer 15 to produce a high voltage (1800 V for initiation of discharge, 500 V for firing). The high voltage is applied to the anode 9 and to the proximity conductor 10 at the cathode side. When the FET 14 is on, therefore, the anode 9 is at the high voltage, and the proximity conductor 11 at the anode side is at 5 V, so that an electric field of great strength is set up between the anode 9 and the conductor 11. On the other hand, with voltage of 5 V applied to the cathode 8 from the power source at all times and with the high voltage applied to the proximity conductor 10 at the cathode side, an electric field of high strength is set up also between the cathode 8 and the conductor 10. The same high voltage is of course applied also across the anode 9 and the cathode 8 to produce an electric field within the tube, whereas the field is much lower in strength than those set up between the cathode 8 and the conductor 10 in the vicinity thereof and between the anode 9 and the conductor 11 close thereto since these electrodes are spaced apart by a larger distance.

Thus, intense electric fields are produced at the respective two locations close to the anode 9 and to the cathode 8. When the discharge tube is initiated into operation, these intense electric fields highly accelerate electrons and cations which are present in small quantities within the tube. The accelerated electrons collide with mercury atoms, ionizing the mercury atoms and producing secondary electrons and cations. The electrons reach the anode 9 or the proximity conductor 10 at the cathode (8) side while repeatedly colliding with mercury atoms and causing ionization. On the other hand, the small quantity of cations present and the cations newly produced by the ionization of mercury atoms due to the collisions of electrons vigorously collide with the cathode 8 or the proximity conductor 11 at the anode (9) side, newly emitting a large quantity of secondary electrons. These secondary electrons repeatedly behave in the same manner as above sequentially. Consequently, the tube is filled with mobile electrons and cations, which migrate toward the respective attracting electrodes to establish discharge. Furthermore, ultraviolet rays emitted upon ionization impinge on the fluorescence 23, producing visible light to thereby cause the tube to luminesce, hence firing of the discharge tube. The increases in the quantities of freely mobile electrons and cations within the tube produce a rapid flow of current, consequently greatly reducing the equivelent resistance between the cathode 8 and the anode 9 within the tube. On the other hand, glass which is an insulator is present between the anode 9 and the proximity conductor 11 and between the cathode 8 and the proximity conductor 10, so that the equivalent resistance between these members fails to become diminished, with the result that after the initiation of discharge, a major portion of current flows concentrically through the region of reduced equivalent resistance, i.e., between the two electrodes 8, 9 within the tube.

Next, when the control signal fed to the 2-pin of the connector 12 becomes lower than the threshold voltage of the FET 14, the FET 14 is brought out of conduction, and no current flows through the boosting transformer 15, with the 5-volt power source voltage only applied to the lower end of the transformer 15. When remaining free of changes in current, the boosting transformer 15 produces no inductive action but merely produces the effect of d.c. resistance. Since the d.c. resistance of the transformer 15 is small with no current flowing therethrough, no voltage drop occurs at the transformer upper end, which has the same potential level as its lower end. The anode 9 and the cathode 8 are therefore brought to the same potential level to discontinue discharge. Although no current flows therebetween, the fluorescence 23 has an afterglow effect to substain attenuating luminescence for a given period of time. The tube is held in a continuously firing state when subsequently initiated into operation within the period of sustained luminescence.

Second Embodiment

Figure 5:
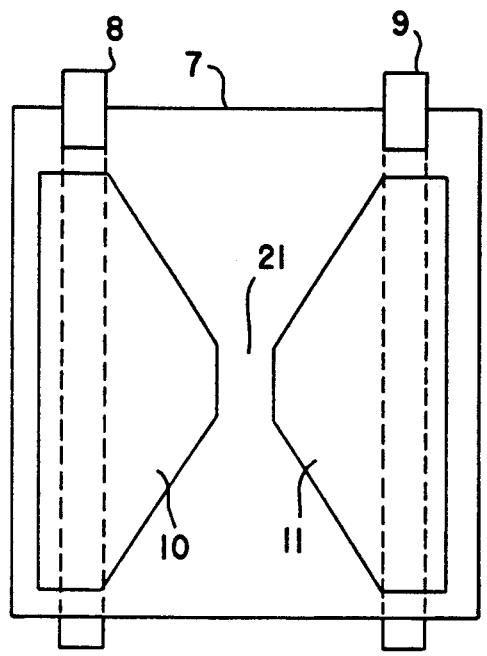
FIGS. 5 to 12 are bottom views showing cold-cathode discharge tubes of second embodiment which have two proximity conductors of different tapered forms.

FIGS. 5 to 12 show devices of second embodiment adapted to advantageously utilize an electric field which will be set up between the two proximity conductors 10, 11 although this field is not considered according to the first embodiment. FIG. 5 shows a proximity conductor 11 close to the anode 9 of a discharge tube, and a proximity conductor 10 close to the cathode 8 thereof. Each of these conductors is so shaped as to comprise a rectangular portion immediately below the corresponding electrode 8 or 9, and a trapezoidal portion integral with the rectangular portion and tapering toward the center of the tube. A suitable clearance 21 is provided between the two proximity conductors 10, 11. With this embodiment as in the case of the first embodiment, an electric field of great strength is set up between the anode 9 and the proximity conductor 11 in the vicinity thereof and also between the cathode 8 and the proximity conductor 10 close thereto. Another electric field of great strength is produced between the two conductors 10 and 11, consequently accelerating larger quantities of electrons and cations. These accelerated electrons and cations function in the same manner as in the foregoing first embodiment to further expedite initiation of discharge. The clearance 21 is set to 4.8 mm according to the present embodiment. The same inverter circuit as the circuit of the first embodiment shown in FIG. 4 is useful for driving. The same effect as above can be achieved by proximity conductors 10, 11 which are shaped variously to taper toward the center of the tube as seen in FIGS. 6 to 12.

Figure 6:
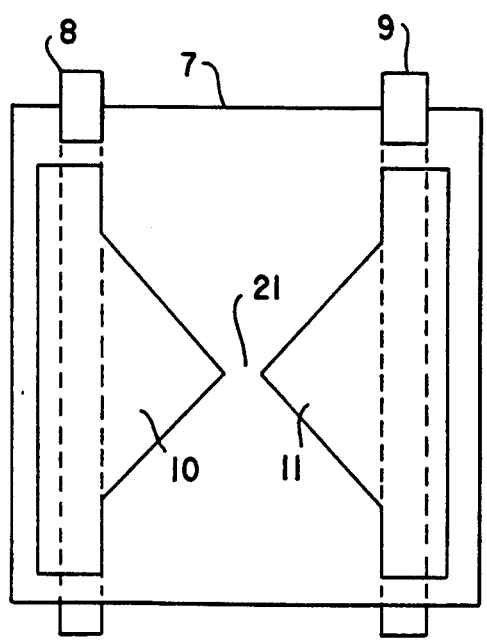

Stated more specifically, FIG. 6 shows a discharge tube body 7 which has proximity conductors 10, 11 arranged symmetrically on its outer bottom surface and positioned under the respective electrodes 8, 9. Each of these conductors comprises a rectangular portion and a triangular portion integral therewith and having a base the length of which is about one-half of the length (16.5 mm) of the long side of the rectangular portion. The two conductors 10, 11 are spaced apart by a clearance 21.

Figure 7:
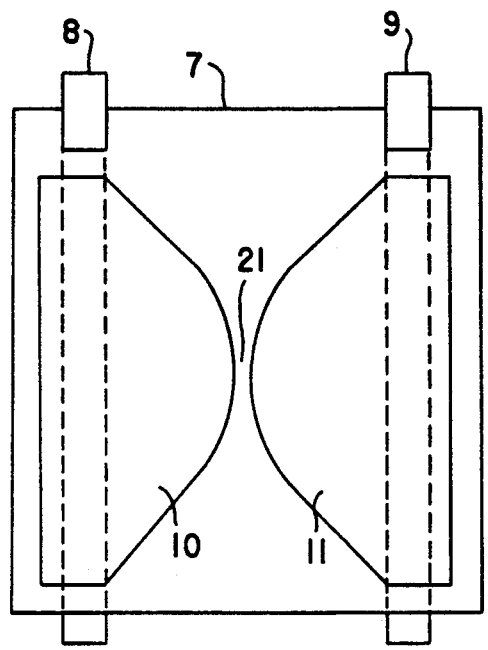

FIG. 7 shows a discharge tube body 7 which has proximity conductors 10, 11 arranged symmetrically on its outer bottom surface and positioned under the respective electrodes 8, 9. Each of these conductors comprises a rectangular portion and a semicircular portion integral therewith. A clearance 21 is provided between the two proximity conductors 10, 11.

Figure 8:
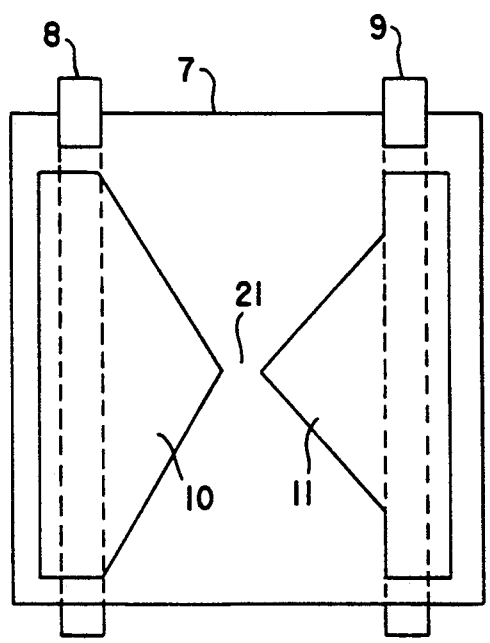

FIG. 8 shows a discharge tube body 7 which has a proximity conductor 10 provided on its outer bottom surface under the cathode 8 and comprising a rectangular portion and a triangular portion integral therewith and having a base of the same length as the rectangular portion. A proximity conductor 11 the same as the one shown in FIG. 6 is provided on the outer bottom surface of the tube body 7 under the anode 9. The two conductors 10, 11 are spaced apart by a clearance 21.

Figure 9:
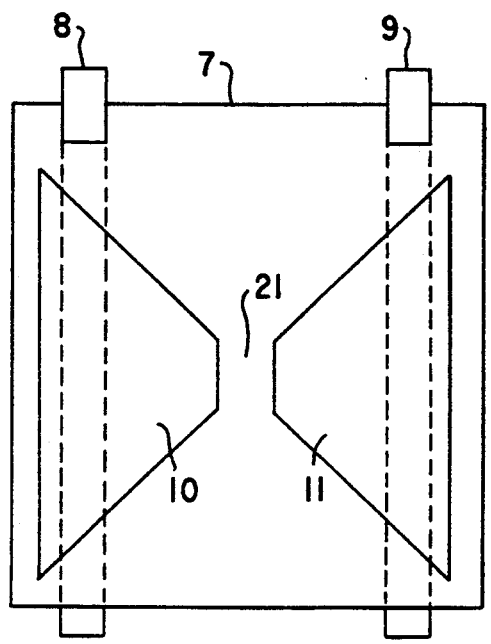

FIG. 9 shows a discharge tube body 7 which has trapezoidal proximity conductors 10, 11 arranged symmetrically on its outer bottom surface under the respective electrodes 8, 9 and spaced apart by a clearance 21.

Figure 10:
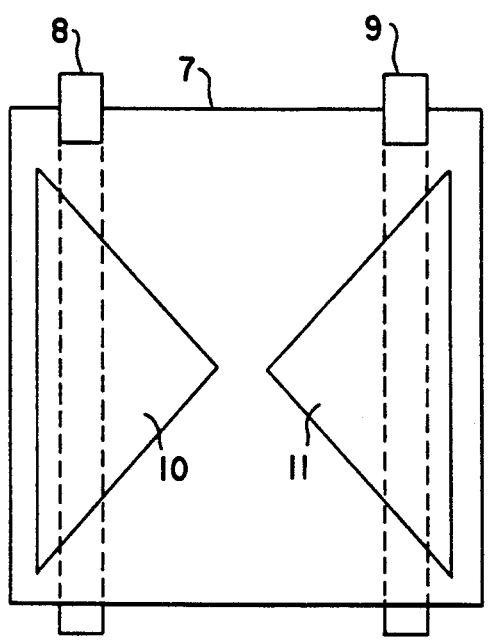

FIG. 10 shows a discharge tube body 7 which has triangular proximity conductors 10, 11 arranged symmetrically on its outer bottom surface under the respective electrodes 8, 9 and spaced apart by a clearance 21.

Figure 11:
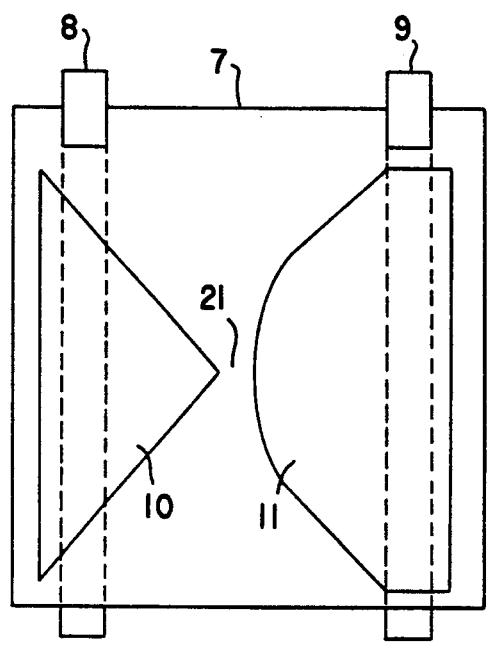

FIG. 11 shows a discharge tube body 7 which is provided on its outer bottom surface with a triangular proximity conductor 10 under the cathode 8 and a semicircular proximity conductor 11 under the anode 9, with a clearance 21 formed between the two conductors 10, 11.

Figure 12:
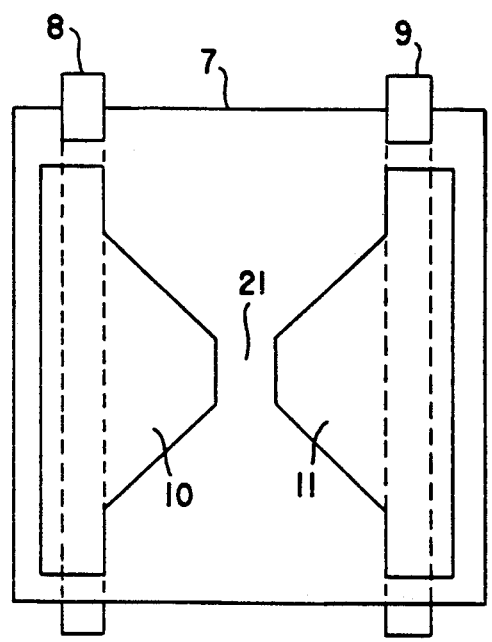

FIG. 12 shows a discharge tube body 7 which has proximity conductors 10, 11 arranged symmetrically on its outer bottom surface under the respective electrodes 8, 9 and each comprising a rectangular portion and a small trapezoidal portion integral therewith. A clearance 21 is formed between the two proximity conductors 10, 11.

Third Embodiment

With the second embodiment, both the proximity conductors 10, 11 have a tapered end, whereas the same result as described above can be achieved by arrangements wherein the proximity conductor 10 or 11 has a tapered end extending toward the other conductor 11 or 10 as shown in FIGS. 13 to 16.

Figure 13:
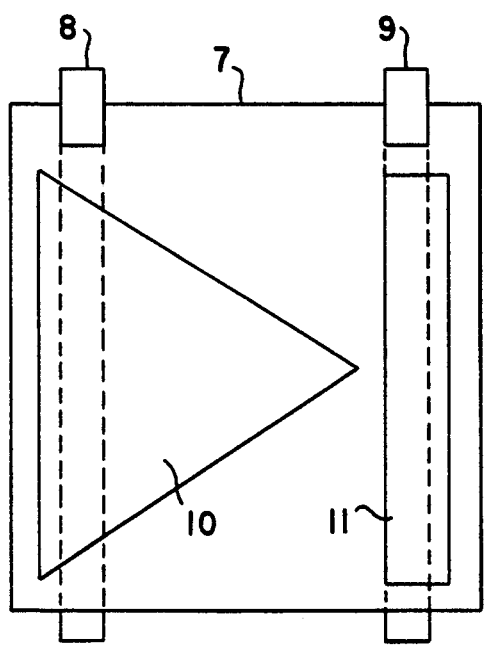
FIGS. 13 to 16 are bottom views of cold-cathode tubes which have two proximity conductors and which are different in the tapered form of one of the two conductors.

FIG. 13 shows a discharge tube body 7 which is provided on its outer bottom surface with a triangular proximity conductor 10 under the cathode 8 and a rectangular proximity conductor 11 under the anode 9, with a clearance 21 provided between the two conductors 10, 11.

Figure 14:
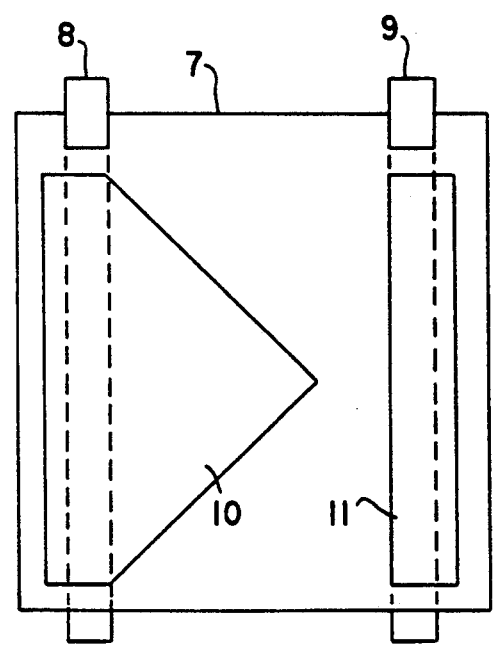

FIG. 14 shows a discharge tube body 7 which is provided on its outer bottom surface with a proximity conductor 10 positioned under the cathode 8 and comprising a rectangular portion and a triangular portion integral therewith, and a rectangular proximity conductor 11 under the anode 9. A clearance 21 is provided between the two conductors 10, 11.

Figure 15:
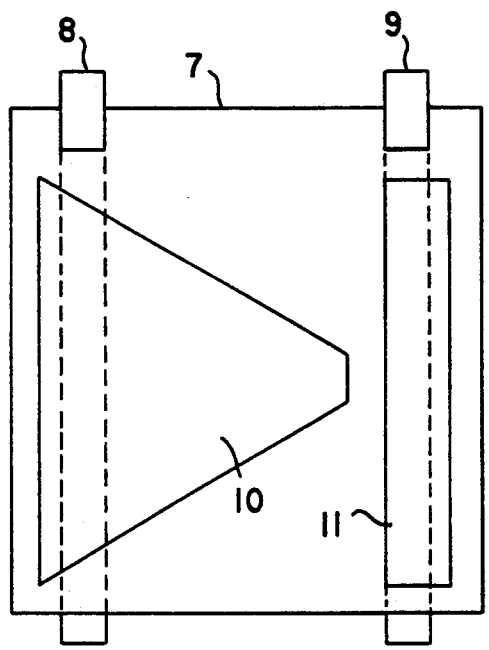

FIG. 15 shows a discharge tube body 7 which is provided on its outer bottom surface with a trapezoidal proximity conductor 10 under the cathode 8 and a rectangular proximity conductor 11 under the anode 9, with a clearance 21 provided between the two conductors 10, 11.

Figure 16:
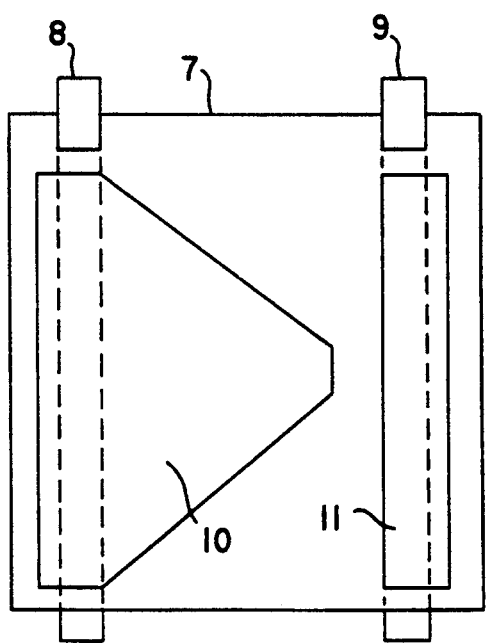
Figure 17:
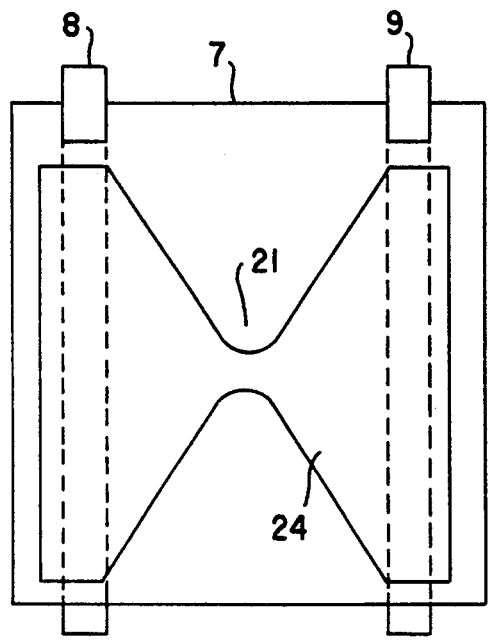
FIGS. 17 to 20 are bottom views showing cold-cathode discharge tubes of third embodiment which have a single proximity conductor with a central constriction and which are different in the form of the constriction.
Figure 18:
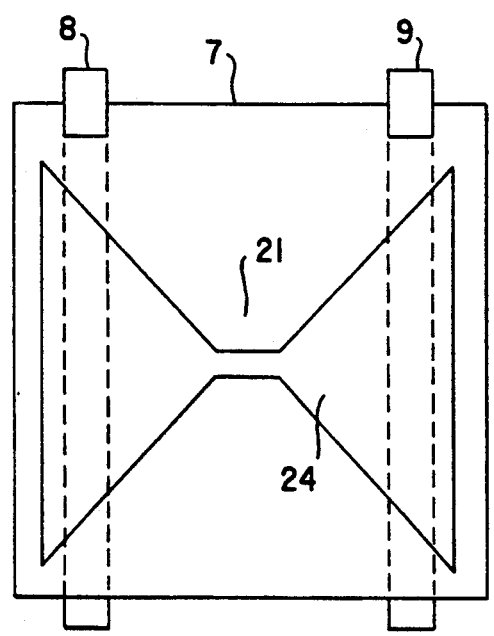
Figure 19:
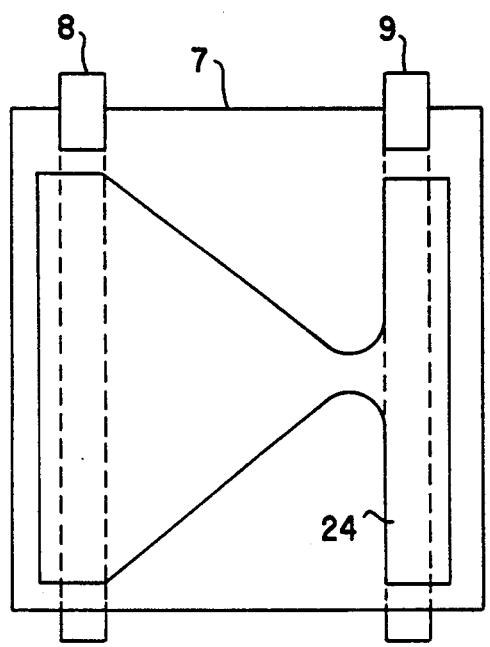
Figure 20:
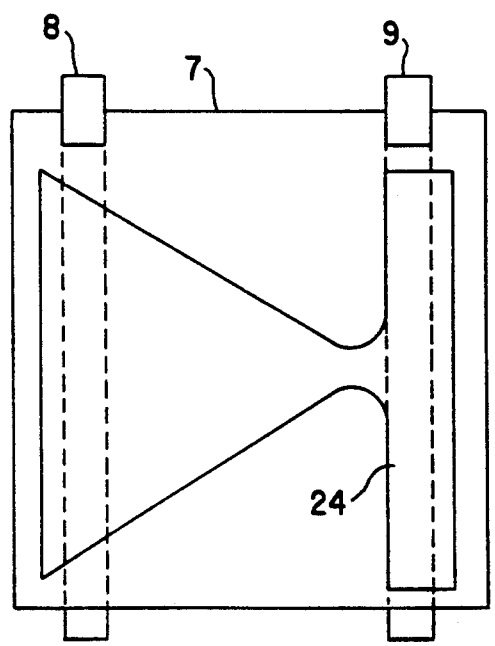
Figure 21:
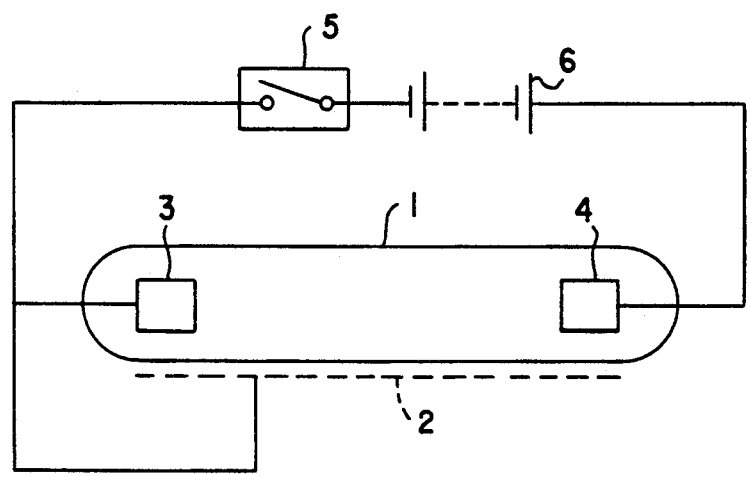
FIG. 21 is a diagram showing the circuit of a conventional example.

FIG. 16 shows a discharge tube body 7 which is provided on its outer bottom surface with a proximity conductor 10 positioned under the cathode 8 and comprising a rectangular portion and a trapezoidal portion integral therewith, and a rectangular proximity conductor 11 under the anode 9. A clearance 21 is formed between the two conductors 10, 11.

The inverter circuit shown in FIG. 4 is usable for driving also in the present embodiment.

Fourth Embodiment

FIGS. 17 to 20 show devices of fourth embodiment wherein a single proximity conductor 24 symmetrically constricted at its central portion or constricted at a portion thereof closer to the anode 9 is disposed between the cathode 8 and the anode 9 and is connected to the cathode 8 or the anode 9.

The foregoing description of the embodiments and the drawings are intended to illustrate the present invention and should not be interpreted as limiting the present invention defined in the appended claims or reducing the scope thereof. Furthermore, the devices of the invention are not limited to the above embodiments in construction but can of course be modified variously within the technical scope defined in the claims.

What is claimed is:

1. A devise for initiating discharge of a cold-cathode discharge tube having a discharge tube body internally coated with a fluorescence, and a cathode and an anode arranged as opposed to each other inside the tube body at opposite sides thereof, the discharge initiating device having a proximity conductor provided outside the tube body and disposed between the cathode and the anode, the discharge initiating device comprising first and second proximity conductors provided independently of each other and arranged below the cathode and below the anode respectively, at least one of the first and second proximity conductors being tapered toward the other of the first and second proximity conductors, providing a clearance between the conductors and a drive circuit connected to the first proximity conductor below the cathode, said drive circuit for applying a high voltage to the first proximity conductor and connected to the second proximity conductor below the anode for applying a lower voltage to the second proximity conductor than to the first proximity conductor.

2. A discharge initiating device as defined in claim 1 wherein the two proximity conductors are each tapered toward the center of the tube body.

3. A discharge initiating device as defined in claim 1 wherein one of the proximity conductors is tapered toward the other conductor, and the other conductor is rectangular.

4. A discharge initiating device as defined in claim 1 wherein the cathode is connected to a low constant voltage source, the anode being connected to an inverter circuit for producing a high voltage in response to a control pulse signal, the second proximity conductor below the anode being connected to a 5- voltage source, and the same high voltage as applied to the anode is applied to the first proximity conductor below the cathode.

5. A discharge initiating device as defined in claim 1 wherein each of the two proximity conductors comprises an electrically conductive adhesive tape and is adhered to an outer wall of the discharge tube body.

6. A device for initiating discharge of a cold-cathode discharge tube having a discharge tube body internally coated with a fluorescence, and a cathode and an anode arranged as opposed to each other inside the tube body at opposite sides thereof, the discharge initiating device having a proximity conductor provided outside the tube body and disposed between the cathode and the anode, the proximity conductor being constricted at its central portion or at a portion thereof closer to the anode, the proximity conductor being connected to the cathode or the anode.

* * * * *